(12) United States Patent
DeShazer et al.

(10) Patent No.: US 6,647,167 B1
(45) Date of Patent: Nov. 11, 2003

(54) SOLID STATE OPTICAL SWITCH AND ROUTER

(75) Inventors: Larry G. DeShazer, Newport Beach, CA (US); Rudy S. Saenz, Encinitas, CA (US); Howard S. Barr, Encinitas, CA (US)

(73) Assignee: Lightwave Technologies, Inc., Encinitas, CA (US)

( * ) Notice: Subject to any disclaimer, the term of this patent is extended or adjusted under 35 U.S.C. 154(b) by 0 days.

(21) Appl. No.: 10/016,660

(22) Filed: Oct. 30, 2001

Related U.S. Application Data
(60) Provisional application No. 60/244,777, filed on Oct. 31, 2000.

(51) Int. Cl.$^7$ ............................. G02B 6/26; G02B 6/42
(52) U.S. Cl. ............................ 385/16; 385/17; 385/18; 385/20
(58) Field of Search ............................. 385/16, 17, 18, 385/20, 21, 22, 23

(56) References Cited

U.S. PATENT DOCUMENTS

| | | | |
|---|---|---|---|
| 3,991,386 A | * 11/1976 | Bjorklund | 372/42 |
| 4,166,254 A | * 8/1979 | Bkorklund | 372/24 |
| 4,833,333 A | * 5/1989 | Rand | 250/492.3 |
| 5,478,371 A | 12/1995 | Lemaire et al. | 65/384 |
| 5,500,031 A | 3/1996 | Atkins et al. | 65/386 |
| 5,620,496 A | 4/1997 | Erdogan et al. | 65/425 |
| 6,456,771 B1 | * 9/2002 | Sanders | 385/124 |
| 6,571,028 B1 | * 5/2003 | LoCascio | 385/16 |

OTHER PUBLICATIONS

M. Born and E. Wolf, *Principles of Optics*, Third Edition, (Pergamon Press Inc., NY, 1965), Section 2.3.4, pp. 90–98.

M.J.F. Digonnet, et al., "Resonantly enhanced nonlinearity in doped fibers for low–power all–optical switching: a review," Optical Fiber Technology, vol. 3, pp. 44–64 (1997).

M.J.F. Digonnet, "A Kramers–Kronig analysis of the absorption change in fiber gratings," SPIE Proceedings, vol. 2841, pp. 109–120.

F.A. Jenkins and H.E. White, *Fundamentals of Optics*, Second Edition, (McGraw–Hill Book Co., NY, 1950) p. 471.

J.H. Schulman and W.D. Compton, *Color Centers in Solids* (Pergamon Press Book, NY, 1962) pp. 1–31 an 325–335.

B.F. Kim, *Spectroscopic Study of Color Centers and $Eu^{2+}$ in $LaCl_3$*, Ph.D. dissertation, The Johns Hopkins University, Baltimore, 1967.

K.E. Peiponen, et al., "On the real refractive index change in some F–coloured alkali halide crystals," II Nuovo Cimento, vol. 2D, pp. 1975–1080 (1983).

R.W. Sadowski, et al., "All–optical switching using color centers in an irradiated phosphorus doped fiber," IEEE Photonics Technology Letters, vol. 8, pp. 897–899 (1996).

V. Mizrahi, et al., "Ultraviolet laser fabrication of ultrastrong optical fiber gratings and of germania doped channel waveguides," Applied Physics Letters, vol. 63, pp. 1728–1730 (1993).

* cited by examiner

*Primary Examiner*—John Juba
*Assistant Examiner*—Leo Boutsikaris
(74) *Attorney, Agent, or Firm*—Knobbe Martens Olson & Bear LLP (57) ABSTRACT

An optical switch and router configuration employing at least one material having radiation induced color centers to produce a change in the reflective index of the material. The material will reflect an input optical signal when the material is illuminated by a control optical signal source and the color centers are induced. An erase beam can be used to remove the color centers, therefore returning the material to a transmittive state such that an input optical signal can be transmitted through it, or the color centers can be allowed to dissipate after their naturally short lifetime.

29 Claims, 12 Drawing Sheets

SOLID STATE OPTICAL SWITCH AND ROUTER

CROSS REFERENCE TO RELATED APPLICATION

This application claims priority to U.S. Provisional Patent Application 60/244,777 entitled "SOLID STATE OPTICAL SWITCH AND ROUTER" and filed on Oct. 31, 2000. The disclosure of the above-described filed application is hereby incorporated by reference in its entirety.

BACKGROUND OF THE INVENTION

1. Field of the Invention

The present invention relates to optical signals, and more particularly optical communications.

2. Description of the Related Art

The advantages of optical fiber communication links are well known throughout the communications industry. Fiber optic communication links provide significant advantages over co-axial electrical communication links, and are virtually free from electromagnetic and radio frequency interference. Modern optical fibers offer low signal attenuation per kilometer, and high data-transmission rates with substantial bandwidth. Optic fibers possess an increased bandwidth over distance, which increases data communication distance for the same speed, and increased security from unauthorized tapping into the network. Additionally, several channels of information may be transmitted bidirectionally over a single fiber by, for example, Wavelength Division Multiplexing (WDM) and Dense Wavelength Division Multiplexing (DWDM) techniques.

In order to capitalize fully on the inherent advantages of optical signal transfer, many designers of optical networks believe that an all-optical system is the best objective to avoid numerous conversions to and from the electronic domain. The goal of all-optical signal processing can include the use of numerous switches, amplifiers, repeaters, and drop/add configurations for tapping into an optical network, along with the standard electronic conversion processes of generating and detecting optical radiation by lasers and photodetectors.

Optical switching has typically been a difficult process to achieve and manufacture, especially in a cost-effective manner. Throughout the years, several methods of switching optical signals have been proposed. In general, these switching technologies have been implemented utilizing a material's nonlinear behavior, for example, by using its electro-optical, magneto-optical, or acousto-optic properties.

For electro-optical and magneto-optical switching, a material's (e.g. lithium niobate and yttrium iron garnet, respectively) refractive index is altered by an external electric or magnetic field, respectively. These changes are typically microscopic alterations in the material's birefringence that modify the polarization of the optical beam propagating through the media. Typically, this external field-induced birefringence in a material will alter the polarization of the propagating beam, and render the beam either transmitting or extinguished between crossed polarizers.

Acousto-optic devices depend on the material's photo-elastic properties. In acousto-optic materials (e.g. tellurium dioxide, lithium niobate) an acoustic signal is propagated in the material producing a regular pattern of higher and lower refractive index regions, forming a Bragg diffraction grating. When coherent radiation is incident upon the activated material in the proper orientation, diffraction occurs at specific constructive angles. Typical Bragg angles are on the order of one degree, so an undesirable amount of horizontal spacing is required to separate the constructive angles far enough to allow accurate switching to occur. Additionally, the acoustically induced moving wave fronts can Doppler-shift the input beam frequency, presenting limitations in DWDM applications.

Another type of modulator or switching element is the polymeric or liquid crystal optical switch. These devices are similar to the electro-optic modulators in that polarization rotation occurs within the material under applied voltage. The liquid crystal or polymeric system is typically located between two polarizers, and the polarization rotation occurs due to the applied voltage activating long chain molecular interactions. An additional optical switch can be made using electro-holography in a photorefractive crystal. The beam is directionally guided by controlling the reconstruction process of volume holograms in the crystal (e.g. potassium lithium tantalate niobate) by means of an externally applied electric field using the quadratic electro-optic nonlinear effect.

Saturated absorption switches are another set of optical switches, performing incoherent as well as coherent optical switching. The process of saturated absorption usually occurs at higher optical powers (Watts/cm$^2$), where the media goes from opaque to transparent when incident optical powers reach saturating levels, called critical optical powers. The saturation mechanism occurs as a result of the beam intensity itself, which changes the population of the material's electronic energy levels to a non-thermal transmitting distribution. Saturated absorption has been used in the past for passive Q-switches in high power lasers.

Similar to the saturated absorption switch is the electro-absorption switching element. For electro-absorption switches, semiconductor band edges are manipulated in junction devices to modify the absorption edge wavelength. In this manner, a switch is constructed whereby incident radiation is either absorbed or reflected.

A new optical technology is applicable to all-optical, all-solid state components using dielectric material on substrate components for optical networks. The technology uses color centers along with active writing and erasing of the color centers for control of a device. Color center technology utilizes a linear optical effect that surpasses nonlinear (second order) phenomena, used presently in switching and routing components, in stability and controllability. In the past, color centers that were used in optical components permanently modified the optical structure and were not used as active controls of optical devices.

Although the above described methods of optical signal manipulation are possible, optical switches and routers having improved speed, higher efficiency and lower insertion loss are still desired for optical fiber communication links. An all-optical signal manipulation device is therefore desirable which is robust in operation, easy to manufacture, and cost effective.

SUMMARY OF THE INVENTION

An optical device comprises a signal input port, a first signal output port, a second signal output port, a controllable optical beam source, and a material susceptible to forming a plurality of radiation induced color centers. A refractive index change is induced in said material when illuminated with the controllable optical beam source so as to reflect an optical signal entering the optical device at the signal input port to the first signal output port when the controllable optical beam source is on, and so as to transmit the optical signal entering the optical device at the signal input port to the second signal output port when the controllable optical beam source is off.

An optical switch comprises a material susceptible to forming a plurality of radiation induced color centers, and a first controllable radiation source wherein a desired refractive index change is produced in the material when illuminated with the first controllable radiation source. The optical switch can further comprise a second controllable radiation source configured to erase the desired refractive index change.

An optical router comprises a plurality of signal input ports, a plurality of signal output ports, and a plurality of optical switches. The plurality of switches comprises a first controllable optical beam source, and a material having a plurality of radiation induced color centers such that a reflective optical structure is formed in the material when illuminated with the first controllable optical beam source so as to reflect an optical signal entering at least one of the plurality of signal input ports to at least one of the plurality of signal output ports.

A method of altering the propagation direction of an optical signal comprises receiving the optical signal on a surface of a material susceptible to forming a plurality of radiation induced color centers, and inducing a refractive index change in the material by illuminating the material with a controllable radiation source.

An optical switch comprises a plurality of layers, wherein at least one layer is made of a material which is susceptible to forming radiation induced color centers, and a first controllable radiation source wherein a desired refractive index change is produced in the at least one layer with the first controllable radiation source.

A method of altering the propagation direction of an optical signal comprises passing the optical signal through a material, and inducing color centers in a portion of the material to create a first portion of the material having a first index of refraction and a second portion of the material having a second index of refraction, whereby the optical signal is reflected at an interface between the first portion and the second portion.

An optical switch comprises a block of material having an optical signal input port and an optical signal output port, a light source positioned to illuminate a surface of the block of material, and a mask covering a portion of the surface.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Materials that have an optically controllable property such as refractive index are used to make optical routers and switches through linear optical interactions. Along with these materials, (e.g., lithium fluoride, lanthanum fluoride, yttrium orthovanadate, phosphate glass) an optical control beam is used to control the switching or routing of optical signal beams by inducing an index change in the material.

The term "color center" is applied to the special configuration in a material which produces optical absorption in a normally transparent spectral region. Color centers can be formed by trapped free electrons or holes (electron deficiencies) at lattice defects in the material. These color centers can be induced by irradiating the material with an optical control beam which, for example, can strip electrons from some of the ions in the material, thus creating a number of free electrons and holes. The free electrons and holes can then move about the material and be trapped at defect locations, therefore forming color centers in the material at such locations. See Schulman and Compton, *Color Centers in Solids*, Pergamon Press Book, NY, 1962, hereby incorporated by reference in its entirety.

The color centers can be distributed in a material with a geometry such that an optical structure can be produced with either reflective properties, such as those created by a plane interface or grating, or refractive properties such as those produced by a prism or lens.

The optical structure induced in the material by the control beam can be transitory and not permanent, since the color centers chosen for the device will have a naturally short lifetime (e.g. a few milliseconds or less) after illumination is discontinued. [Kim, *Spectroscopic Study of Color Centers and $Eu^{2+}$ in $LaCl_3$*, Ph.D. dissertation, The Johns Hopkins University, Baltimore, 1967, hereby incorporated by reference in its entirety]In some embodiments, they can be removed after a configurable time duration by an erase beam. Thus, the device will perform switching and routing functions for the signal beam when the control beam is on, but will be transmittive with very low insertion loss when the control beam is off or the erase beam has been activated.

When provided, the erase beam can operate at wavelengths different from both the signal and control beams, and does not need to be a narrow band of optical radiation. The erase beam can provide control over the switching rates, and can provide a device with high on-off switching and routing speeds.

Figure 1:
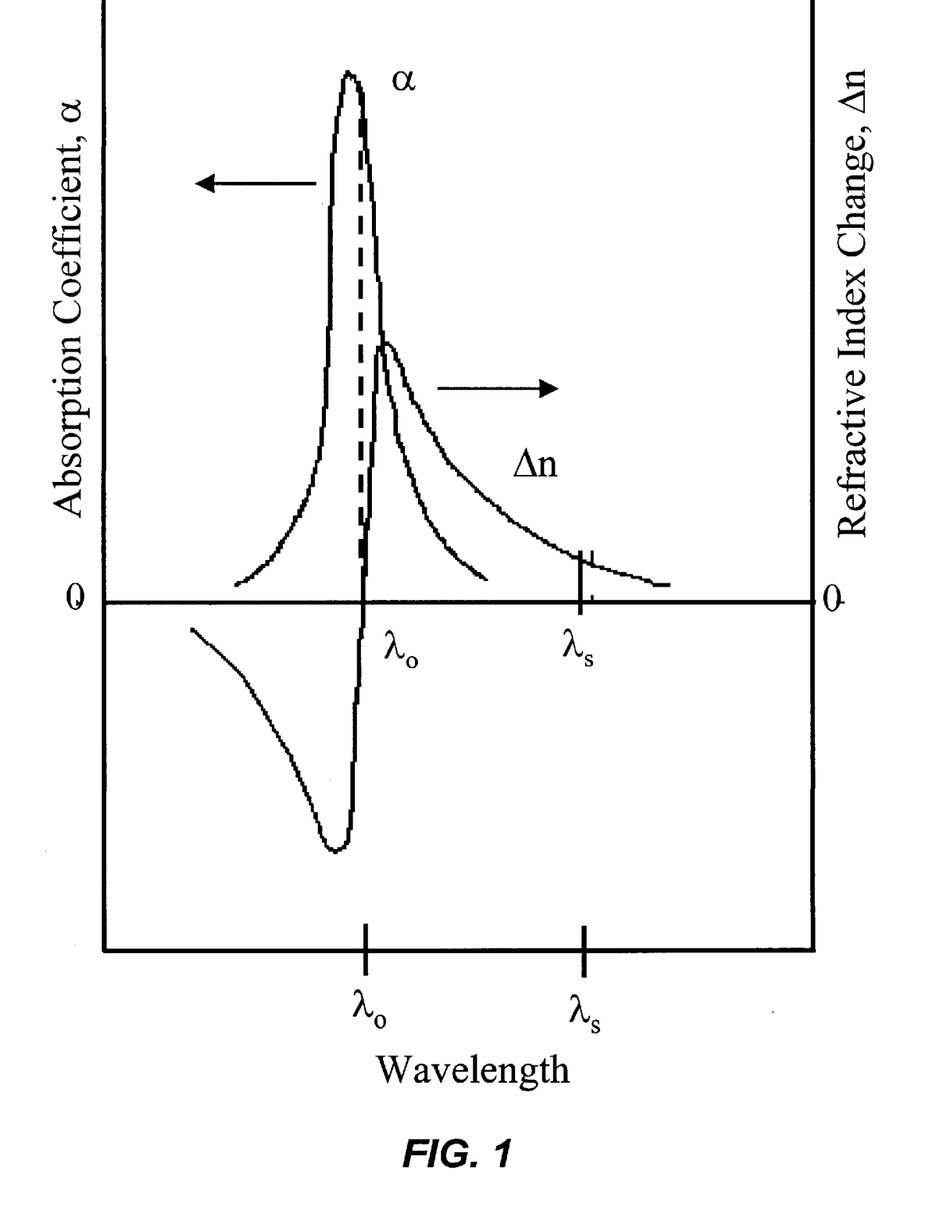
FIG. 1 is a graphical illustration of change in refractive index and absorption coefficient with respect to variation in wavelength of an optical signal.

FIG. 1 illustrates how a change of refractive index is related to absorption as a consequence of the optical principle of dispersion [ref. Born and Wolf, *Principles of Optics*, Third Edition, Pergamon Press Inc., Section 2.3.4, pp. 90–98]. For the case of color center formation, the control beam creates an absorption $\alpha$ at a control wavelength of $\lambda_0$ as shown in FIG. 1. This change in absorption will be accompanied by a change in refractive index, $\Delta n$ [ref. Digonnet].

The value of $\Delta n$ can be determined by Cauchy's formula [ref. Jenkins and White, *Fundamentals of Optics*, Second Edition, p. 471] to vary as $$\Delta n \sim \left(\frac{\lambda_0}{\lambda_S}\right)^2,$$

and has magnitudes from $10^{-4}$ to $10^{-2}$ depending on the type of color centers created in the material.

As can be seen in FIG. 1, there is no absorption at $\lambda_0$ before the control beam is turned on. Since the signal wavelength $\lambda_S$ is greater than that of the control beam $\lambda_0$ for the infrared signals (i.e., 1.53 $\mu$m) used in fiber-optic communication systems, $\Delta n$ is a positive change, or increase. There is negligible absorption at the signal wavelength $\lambda_S$ due to the induced color centers, even though the color centers make a significant contribution to the refractive index change at $\lambda_S$ [ref. Digonnet, "A Kramers-Kronig analysis of the absorption change in fiber gratings," SPIE Proceedings, vol. 2841, pp. 109–120, hereby incorporated by reference in its entirety].

Figure 2A:
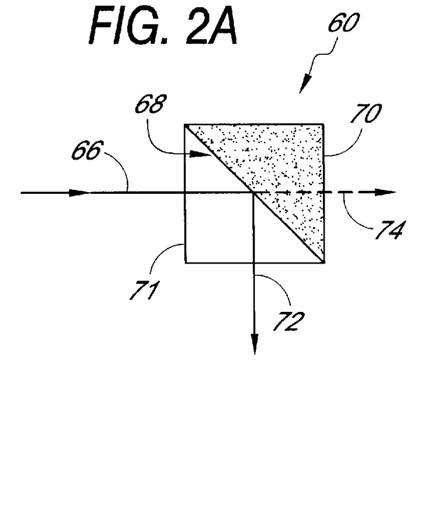
FIG. 2A illustrates an optical switch employing reflection at a single plane interface of a reflective configuration using refractive index change optically-induced by a control beam.
Figure 2B:
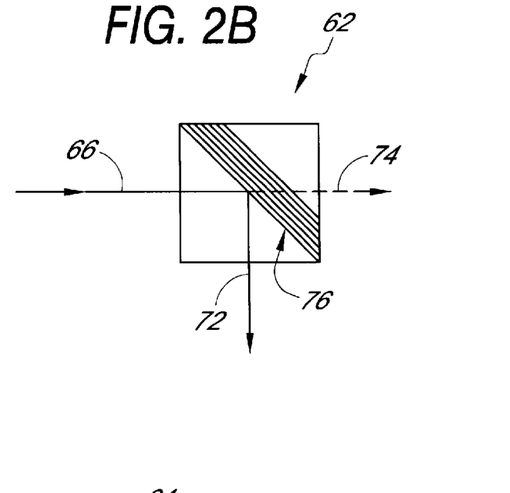
FIG. 2B illustrates an optical switch employing reflection from multiple interfaces of a reflective configuration using refractive index change optically-induced by a control beam.
Figure 2C:
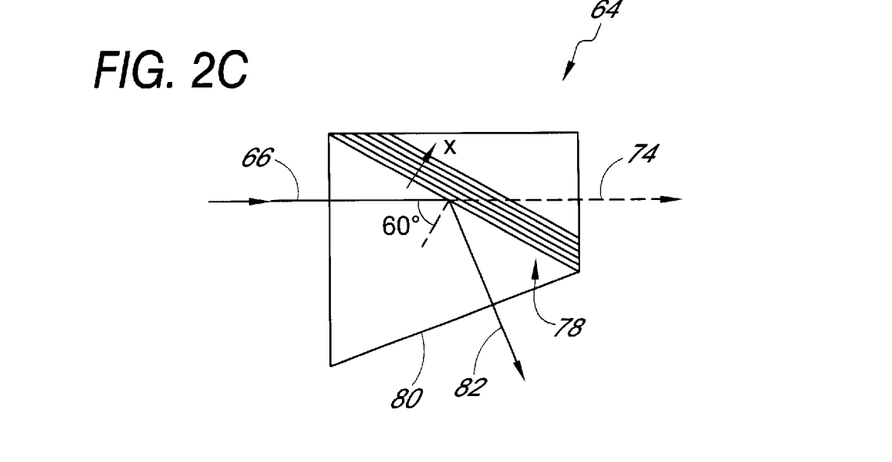
FIG. 2C illustrates an optical switch employing reflection from plane grating at 60° of a reflective configuration using refractive index change optically-induced by a control beam.

FIGS. 2A–C illustrate several optical switching configurations 60–64 that can be optically induced by a control beam to form refractive index changes in a material. In FIG. 2A, reflection of an input signal 66 is obtained by producing a single plane interface 68 where a first portion of a material (illustrated as shaded region 70 in FIG. 2A) is irradiated by a control beam (not shown), thereby inducing color-center absorption at $\lambda_0$ and a concurrent index change $\Delta n$ at $\lambda_S$ in the first portion of the material. The remaining second portion of material (denoted 71 in FIG. 2A) is not illuminated. When the control beam is on, at least some of the signal beam energy is reflected by 90° (45° angle of incidence) into a switch-on port 72. When the control beam is off, there is no index change in the material and the switch is off, allowing the signal to be essentially completely transmitted through the region 70 with low insertion loss to a switch-off port 74. As is explained in additional detail below, the selective illumination may be accomplished by masking the second portion 71 of the material.

Figure 2D:
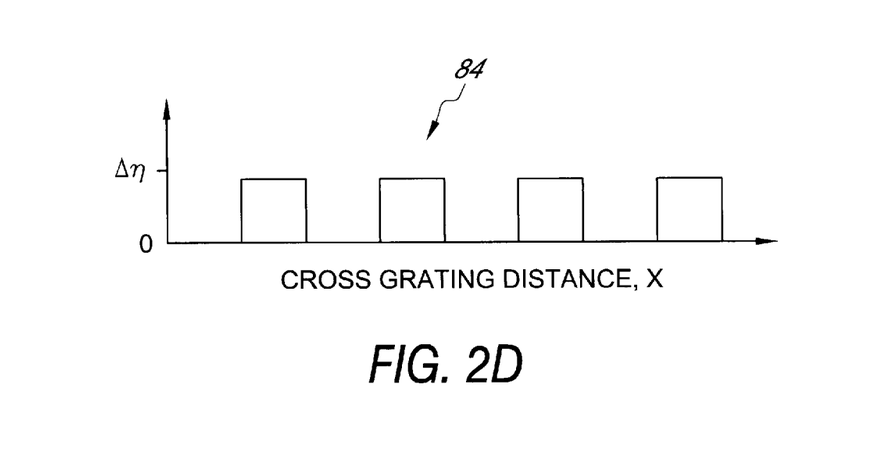
FIG. 2D illustrates a refractive index cross-sectional profile of plane grating optically-induced by a control beam.

In the switch 62 illustrated in FIG. 2B, reflection of the input signal 66 is obtained by producing a multilayer stack 76 of index-changed and non-index-changed layers as illustrated in FIG. 2D. This multilayer stack 76 acts as a reflection grating where the layer thicknesses can vary from values of quarter-wave ($\lambda_S/4$) to millimeters. This multilayer design can substantially increase the signal reflectivity over that of a single surface by factors of up to about $\times 10^4$.

FIG. 2C illustrates the switch configuration 64 where the input signal 66 is reflected at a 60° angle of incidence from a multilayer stack 78. The greater angle of incidence can increase the reflectivity of the multilayer stack 78 by a factor of about four for an angle increase from 45° to 60°. An exit face 80 for a switch-on port 82 is perpendicular to maintain low losses.

FIG. 2D illustrates a refractive-index profile 84 of the multilayer stack illustrating $\Delta n$ vs. cross-grating distance x for the switch 62. This profile 84 is obtained by using a mask in the optical path of the control beam to illuminate only those regions where an index change $\Delta n$ is desired.

Figure 3:
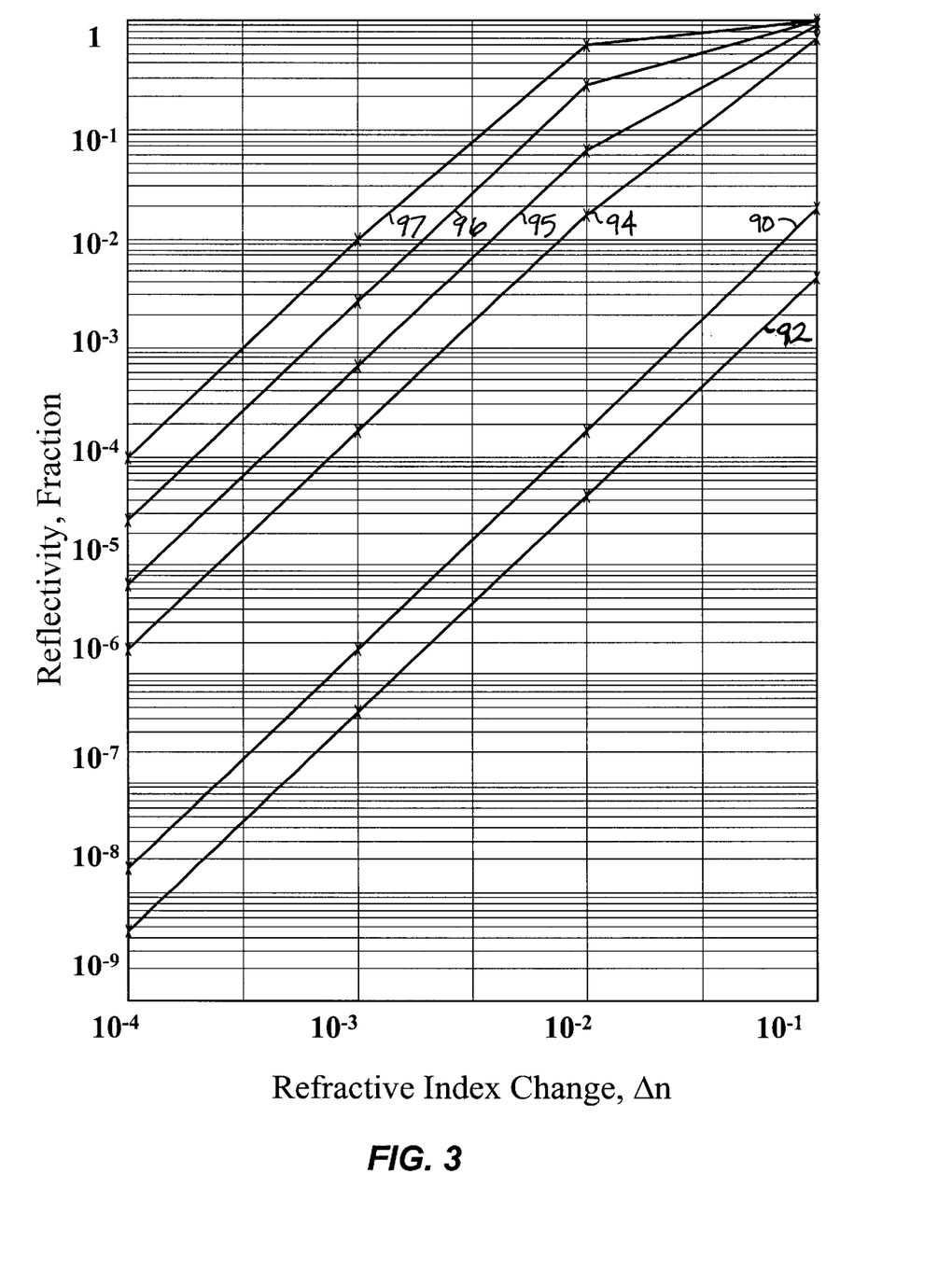
FIG. 3 is a graphical illustration of reflectivity at an angle of 45° as a function of refractive index change for various single surface, single quarter-wave layer, and step-wise stacks of 10, 20, 40 and 80 quarter-wave layers.

FIG. 3 graphically illustrates signal reflection as a function of refractive index change $\Delta n$ at a 45° angle of incidence from a single interface 90, a single quarter-wave layer 92, and multilayer structures composed of 10, 20, 40 and 80 layers, illustrated respectively by traces 94, 95, 96 and 97. The 45° angle of reflection can polarize the reflected signal beam perpendicular to the optical plane of incidence. The thickness of the layers were chosen to be $\sqrt{2}\lambda_S$ where the signal wavelength $\lambda_S$ had a value of 1.53 $\mu$m in the reflectivity peak at 1.53 $\mu$m for a 45° angle. For FIG. 3, the original refractive index ($n_0$) had a value of 1.50.

The reflectivity of a single interface can be given by the Fresnel formula [Ref. Born and Wolf, p. 40]. For small refractive-index changes, $\Delta n < 0.1$, as expected here, the reflectivity R of a single interface at 45° can be well approximated by the following formula, where '$n_0$' is the original refractive index.

$$R = \left(\frac{\Delta n}{n_0}\right)^2$$

The sign of $\Delta n$, either positive or negative, does not affect the reflectivity value since $\Delta n$ is squared. A layer can be defined as a quarter-wave step with an index of ($n_0+\Delta n$), followed by a step of index $n_0$. All six log-log plots in FIG. 3 have a slope value of two, therefore verifying the square power dependence of the refractive index change for the reflectivity when $\Delta n < 0.1$. The above formula holds true for optical beams polarized perpendicular to the optical plane of incidence. For a single interface with $\Delta n = 0.01$ and $n_0 = 1.5$, the reflectivity R is $4.4 \times 10^{-5}$, as plotted in FIG. 3, while for a reflector having 80 layers, the reflectivity R is 0.61.

Figure 4:
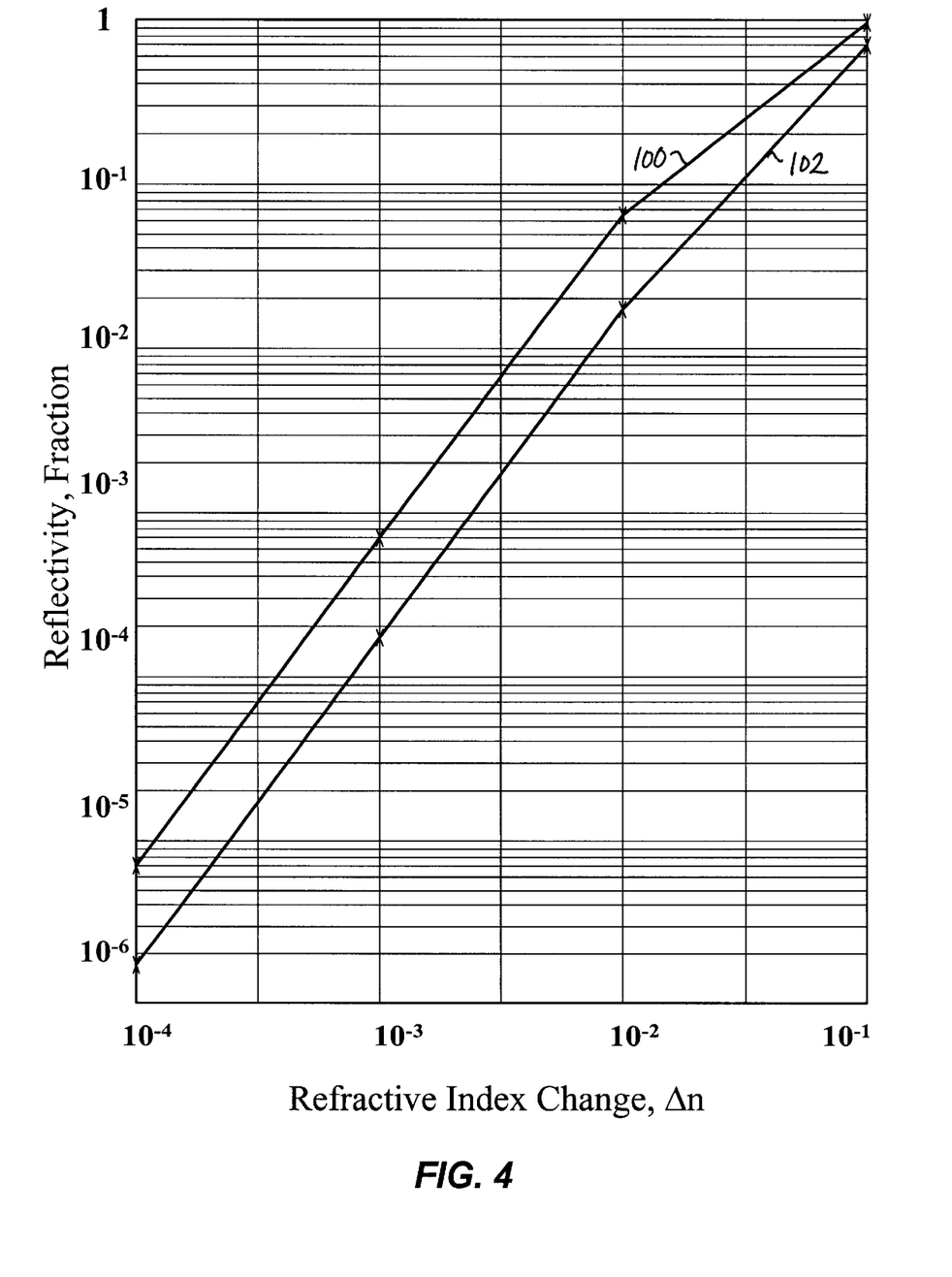
FIG. 4 is a graphical illustration of reflectivity as a function of refractive index change or a 60° angle of incidence and a 45° angle of incidence in a ten-layer stack.

FIG. 4 shows the increase in reflectivity for a 60° angle of incidence 100 over a 45° angle of incidence 102 as a function of refractive index change $\Delta n$ in a ten-layer stack. The 60° angle of incidence increases the reflectivity 100 from the multilayer reflector by a factor of 4.1 over the 45° angle case 102. At a 60° angle, the multilayer stack allows the parallel polarization of the signal beam to be partially reflected.

Figure 5:
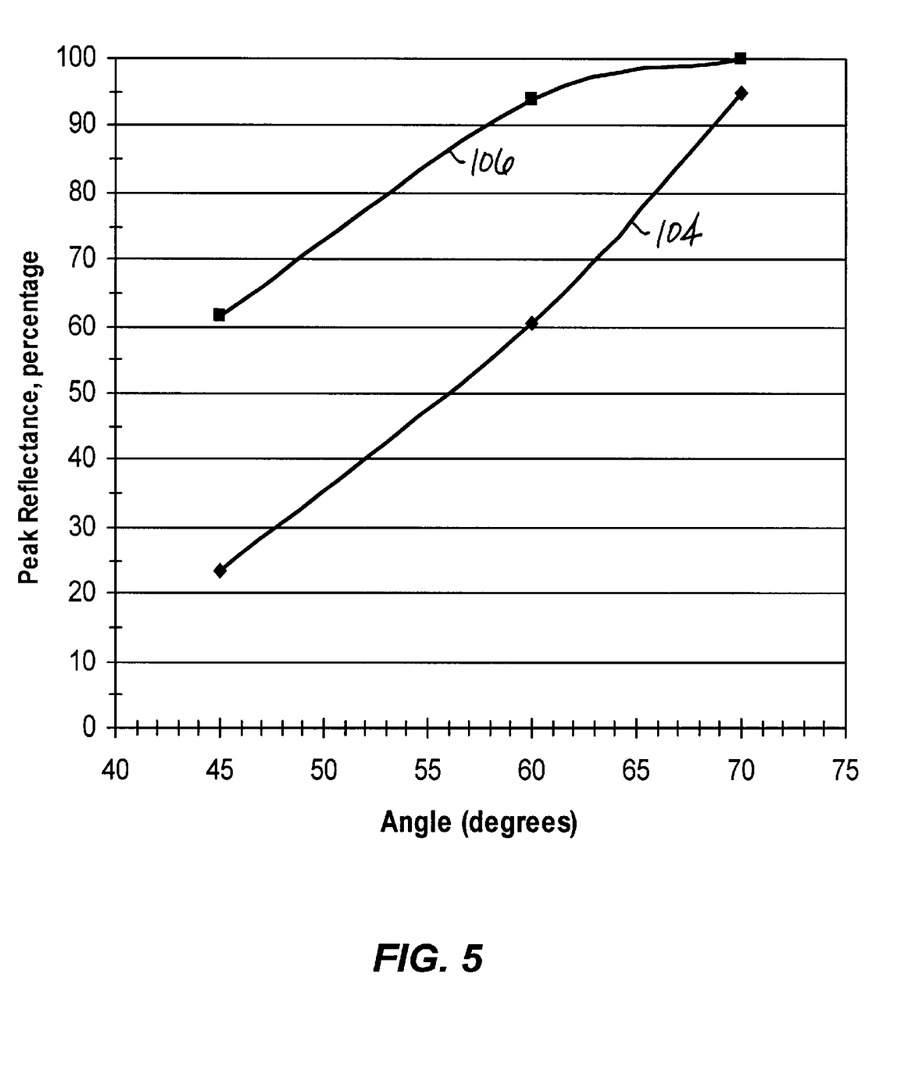
FIG. 5 is a graphical illustration of peak reflectance percentage as a function of angle of incidence for 40 and 80 layer gratings.

It should also be noted that higher reflectivities can be achieved for a larger number of layers with increased angles of incidence. Reflectivities for 40 and 80 layer structures are illustrated by traces 104 and 106 in FIG. 5. For example, 99.58% reflectivity can be achieved with an 80-layer grating at a 70° angle of incidence with $\Delta n = 0.01$, and an absorption coefficient $\alpha_s = 1$ cm$^{-1}$. The effect of absorption on reflectance is minor (<1%) when $\alpha_s < 10$ cm$^{-1}$.

Figure 6:
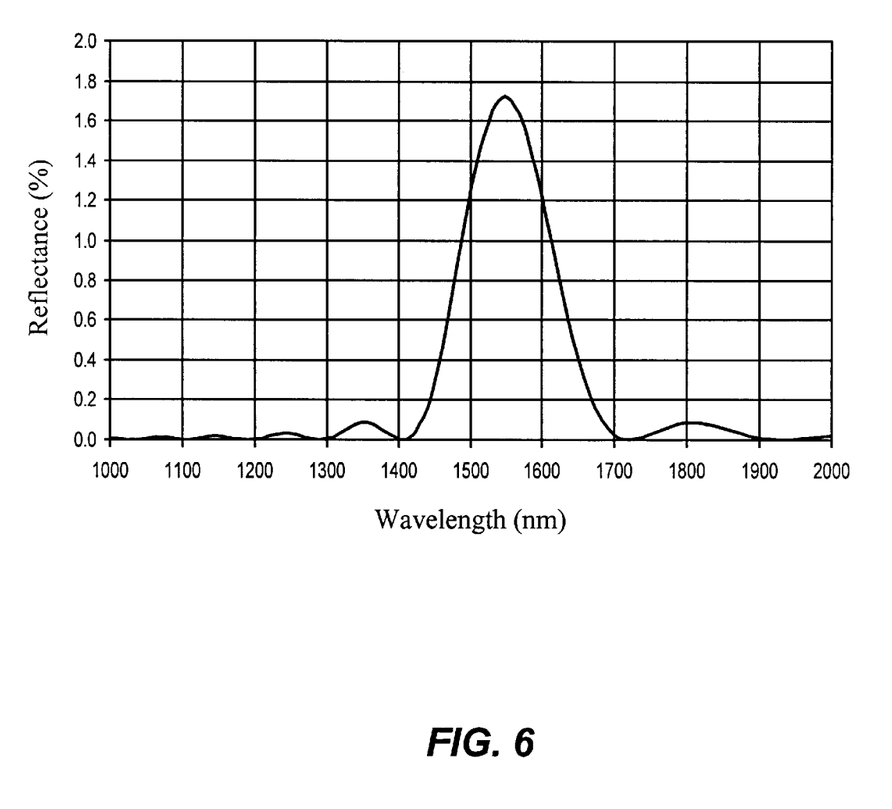
FIG. 6 is a graphical illustration of reflectivity as a function of wavelength for a ten-layer reflective stack, where $\Delta n=10^{-2}$ at a 45° angle of incidence.

The spectral reflection characteristic (R vs. $\lambda$) is shown in FIG. 6 for a ten-layer stack when $\Delta n=10^{-2}$ at a 45° angle of incidence. The center wavelength is 1.55 $\mu$m and the full-width at half-maximum of the spectral curve is 260 nm. Therefore, a multilayer reflector has a narrow bandpass that places a relatively low tolerance on the layer thickness.

Figure 7:
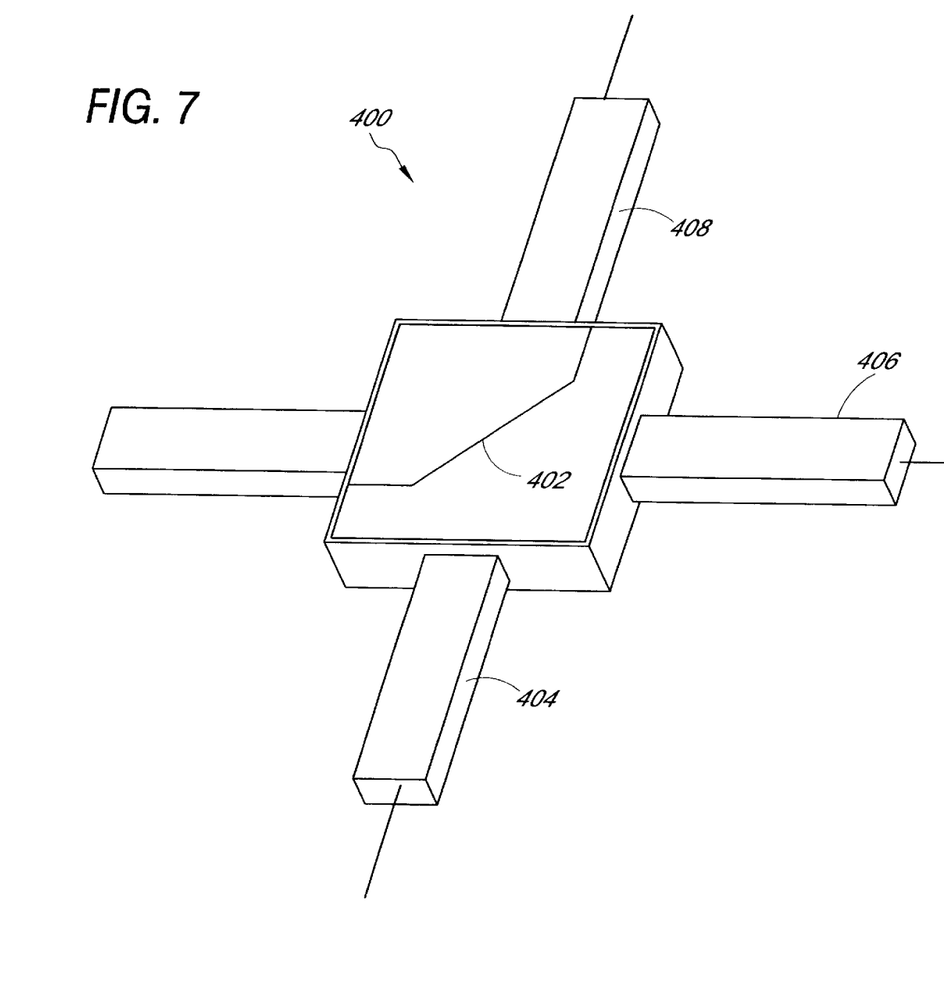
FIG. 7 is an isometric view of the physical layout of a single switch device embodying a single layer of refractive index change, such as that illustrated in FIG. 2A.

FIG. 7 shows an isometric view of the physical layout of a single switch device 400 embodying a single interface 402 of refractive index change, such as illustrated in FIG. 2A. An input signal beam is received at an input port 404 of the switch 400 consisting of optical signal transmission media such as a plurality of optical fibers or a waveguide. The input signal beam will be switched to a switch-on port 406 when a control beam (not shown) is on, thereby inducing a refractive index change in the device material 402. When the control beam is off, no index change will be present and the signal will be transmitted to a switch-off port 408 with very low insertion loss.

Figure 8:
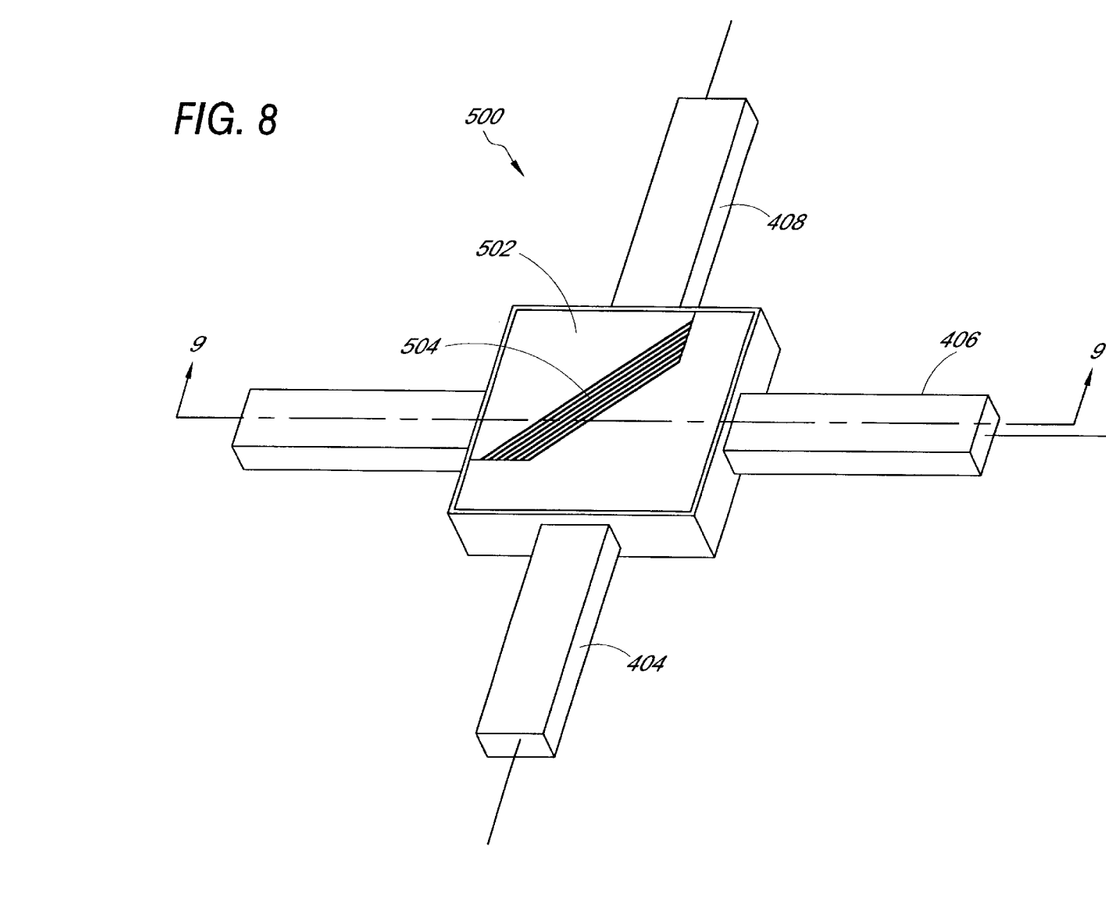
FIG. 8 is an isometric view of the physical layout of a single switch device embodying multilayers of refractive index changes, such as that illustrated in FIG. 2B.

FIG. 8 shows an isometric view of the physical layout of a single switch device 500 embodying a mask 502 of multiple layers 504 of refractive index changes, such as illustrated in FIG. 2B. The mask consists of a series of parallel slits at an angle of 45°, allowing a control beam $\lambda_C$ (not shown) to create multiple layers 504 of step-wise index changes (as illustrated in FIG. 2D). It will be appreciated that the index profile may take forms other than step-wise, such as sinusoidal. If desired, an erase beam $\lambda_E$ can illuminate the slits after the control beam is turned off to remove the index changes.

The signal output from the switch-on port can be completely or partially polarized. Additionally, the polarization state of the signal output can be restored to an unpolarized condition by placing a circular polarizer at the exit port. There is no polarization change when the switch is in the off-mode.

Such a method of creating a structure that functions as a switch or router allows for a highly integrated electro-optic structure which was not possible in the past due to the complexities of integrating the waveguides and controlling electronics. In the illustrated embodiments, the control electronics/optics are located out of the plane of the waveguides and are not in direct contact with the optical structure. This allows the drive and control electronics to be fabricated on another substrate, where optical generation (e.g. LED) or detection (e.g. PIN) is readily achievable.

Figure 9:
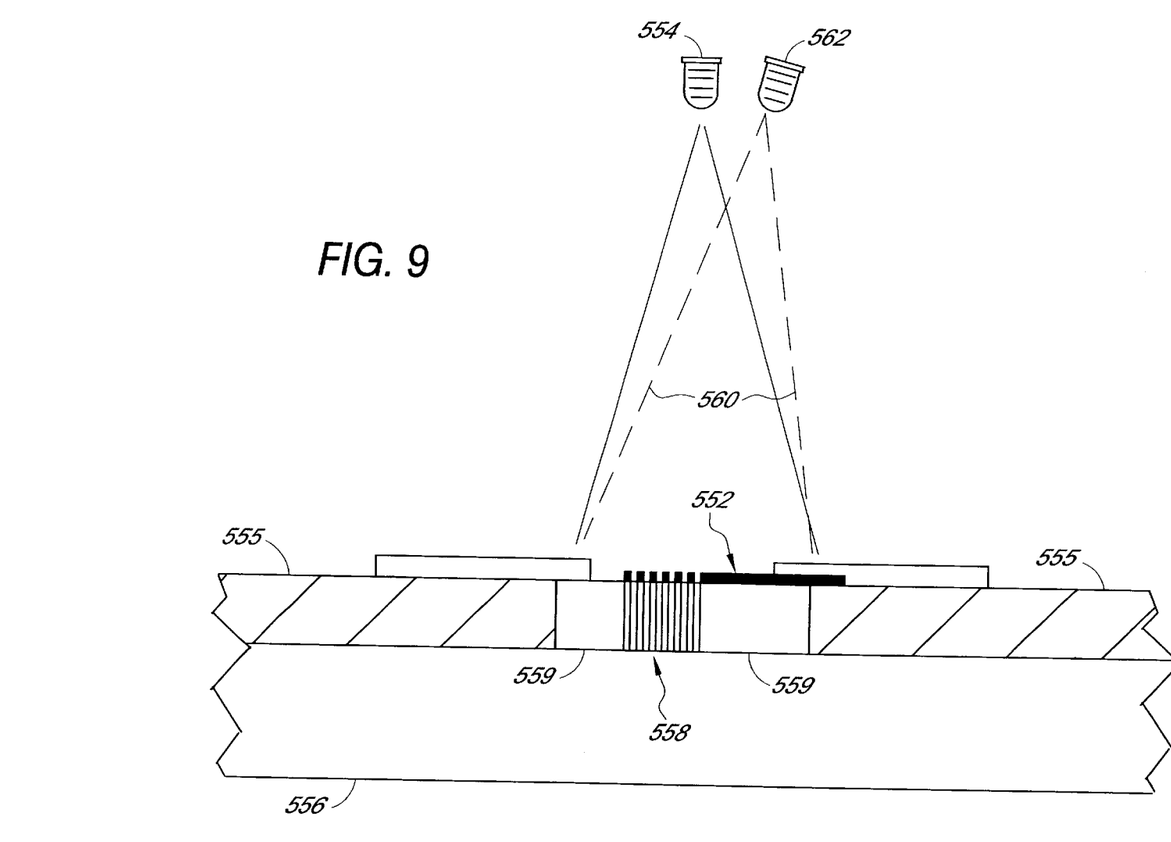
FIG. 9 is a side view of the physical layout of a single switch device according to the present invention.

FIG. 9 shows a cross sectional side view along line 9—9 of the switching device 500 of FIG. 8 mounted to a substrate 556 and embodying a device mask 552 and a remote control beam optical pulsed source 554 of wavelength $\lambda_C$ for forming a reflective optical structure. The mask 552, body, and waveguides 555 are typically formed by techniques practiced extensively in the microelectronics industry, where such techniques are well known to those skilled in the art and are therefore omitted from this specification.

The device mask 552 can be formed on the switch material 559, and a light emitting diode (LED) can be employed as the control signal source 554 for the device, which can be located out of the plane of the device construction, and can be a pulsed source. It will be appreciated that a variety of options for generating a suitable control beam are possible. For example, the LED wavelengths in some embodiments can range from about 300 to about 680 nm. The mask may be formed in strips, as shown in the top view of FIG. 8 as well, and a multilayer structure 558 with alternating layers having different indices of refraction may be formed in the switch material 559. The multilayer structure 558 is shown schematically for illustration purposes only and the invention is not limited to such an embodiment. The intensity of the control beam 554 on the mask 552 can further be controlled and increased by using lenses to focus the beam.

In addition, an erase beam 560 with wavelength $\lambda_E$, different from $\lambda_S$ and $\lambda_C$, can serve to remove the index changes caused by color centers in the switching device 550 in order to achieve faster switching rates. The optical pulsed source 562 of the erase beam 560 can be placed adjacent to the control beam source and illuminate the same region of the device mask as the control beam. Alternatively, the source 562 of the erase beam 560 can be placed in a location on the opposite side of the substrate from the control beam source, thereby avoiding transmission of the erase beam 560 through the mask 552. The erase beam source 562 can also be a pulsed infrared diode to provide a short heat pulse to accelerate the decay of transient color centers. In one embodiment of the switching device 550, the switch material 559 can be lithium fluoride, the control beam source 554 can be a blue LED, and the erase beam source 562 can be a red LED.

Figure 10:
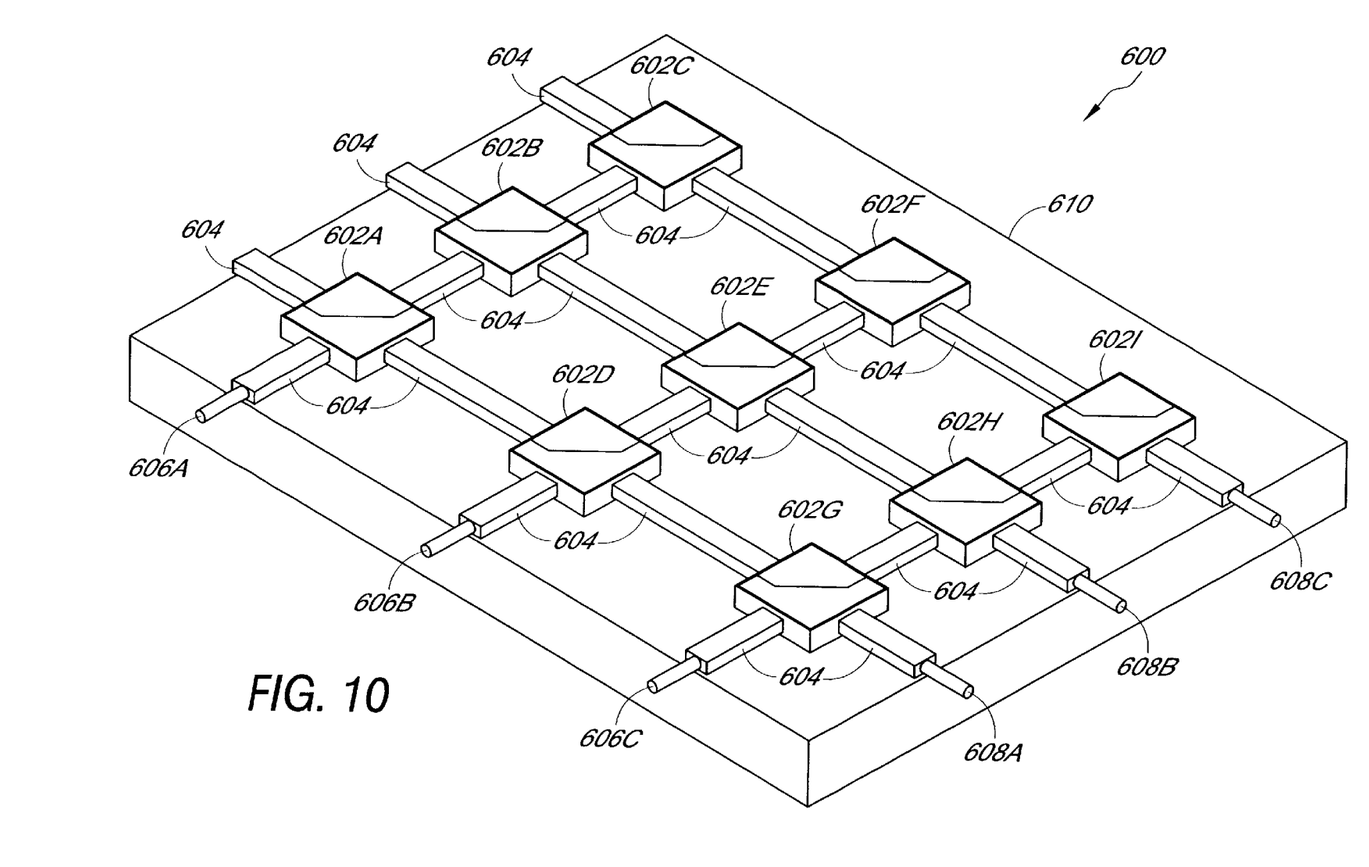
FIG. 10 is an isometric view of a 3×3 array comprising nine switches according to the present invention.

FIG. 10 shows an isometric view of one embodiment of an N×N switch array 600, where N=3 in the illustrated array, comprising nine switches 602A–I connected by a plurality of waveguides 604 with optical fibers at each of a plurality of input and output ports 606A–C, 608A–C respectively. Using the basic router/switch configurations detailed previously, the all-optical N×N array 600 can be constructed on a substrate 610. This device 600 allows any one-of-N input signals at the input ports 606A–C to be switched to any one of N output ports 608A–C.

Figure 11:
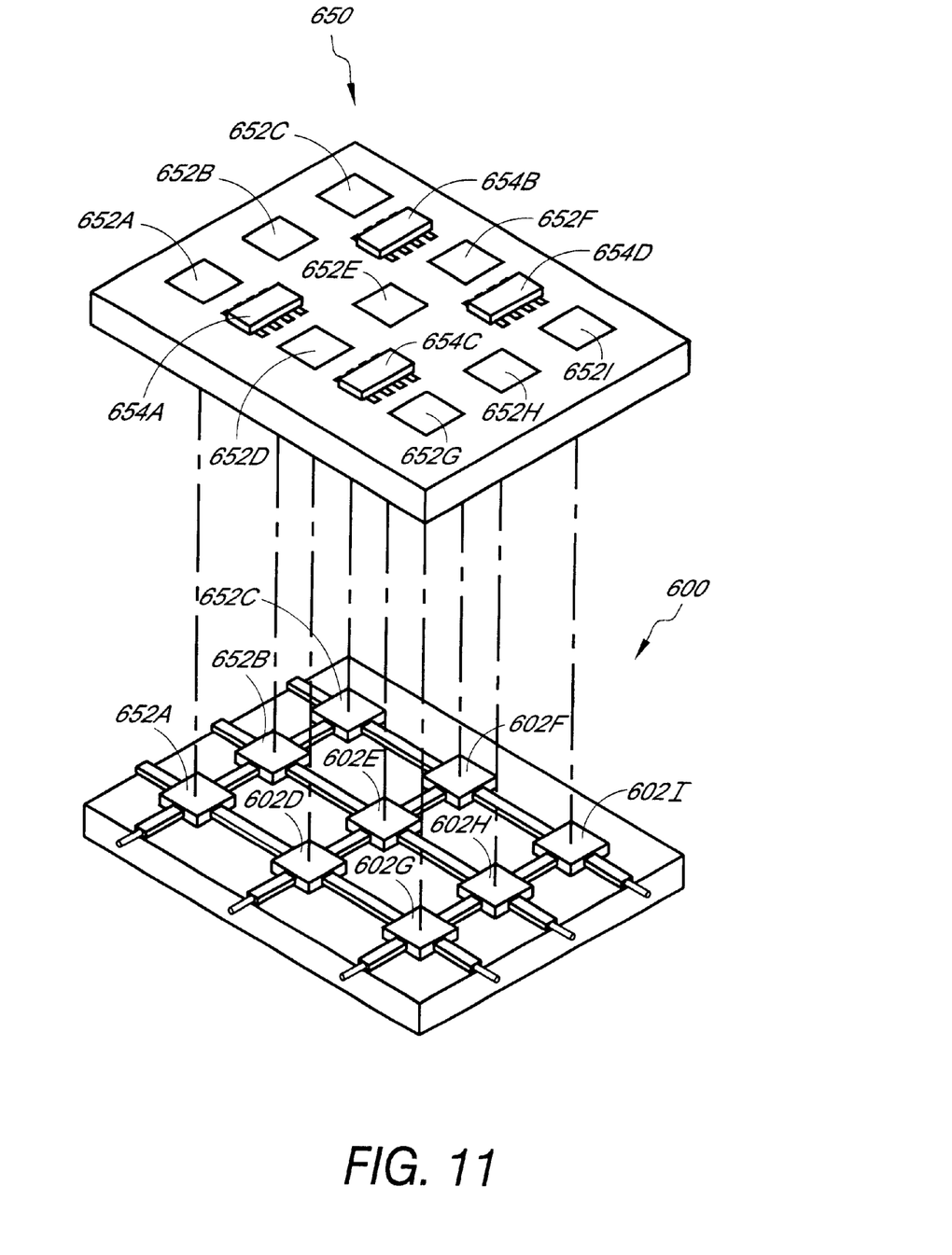
FIG. 11 is an isometric view of a 3×3 router and optical source array.

An all-optical router as illustrated in FIG. 11 may be constructed in two parts. The first part may comprise an optical substrate and switching elements, formed by connecting the basic switching/routing cells illustrated in FIGS. 7 and/or 8, to create the array 600 of routing cells 602A–I. Each cell 602 may be made of materials wherein the base material can act both as a waveguide and a switch/router material. By optically masking each cell 602, the desired switching/routing condition can be initiated by a control beam.

The second part of the all-optical router of FIG. 11 may comprise the construction of the control beam sources, or an optical source array 650. These sources can be fabricated in a pattern corresponding to the N×N switch/router cell pattern. The optical source array 650 comprises a plurality of control beam sources 652A–I for illuminating corresponding switching cells 602A–I in the switch array 600, and a plurality of drive circuits 654A–D on a substrate 656 for controlling the operation of the control beam sources 652A–I. It will be appreciated that a larger or smaller number of drive circuits may be used to control the operation of the control beam sources 652A–I and is not limited to the number described or illustrated. After fabrication, the array 650 of control beam sources 652A–I can be placed in close proximity to the first part of the router 600, allowing for operation of the switch/router elements 602A–I.

Operation of the router 600 is based upon the previously described unit cell operations. When a specific cell's corresponding control beam is off, the cell is isotropic and transmittive to a signal beam propagating in any direction. When a cell's corresponding control beam is on, the cell deflects the signal beam at a 90° angle. It will be appreciated that a reflection angle smaller or larger than 90° can be produced by modifying the cells, such as the cell 64 illustrated in FIG. 2C.

In operation, the 3×3 router of FIG. 10 can route, for example, a signal received at the input port 606A to either output port 608A, 608B, or 608C by illuminating the appropriate switching cell 602A, 602B, or 602C, respectively. A similar operation is used to route signals received at input ports 606B and 606C to output ports 608A–C by illuminating the appropriate switching cells 602D–I.

Also, it should be noted that although the above N×N router device is described as a two-port system (input and output), the device could operate as a four-port device. Since the routing element is a reflecting component, backside or frontside illumination will still result in the routing of a signal beam in either direction. This creates a four-port structure where two input sets and two output sets are possible.

Subsections of this N×N device, namely 1×N structures, can be used as data selector or multiplexer devices. Data selectors and multiplexers are typically 1×N devices used to route one-of-N signals out of a port, or reciprocally select one-of-N signals coming into a port. As can be seen in FIG. 10, if N inputs are available to just one output channel, a 1×N selector can be constructed.

For the N×N device, high reflection coefficients can assure that a particular input signal is outputted with an amplitude transfer function near unity. However, low efficiency reflection does allow for multiple switches. As seen in FIG. 10, an input signal crosses numerous switch/router cells. If a cell is only partially reflective when activated, significant amounts of signal beam power continue in the channel to the next switch/router cells. If the next cell is on, another output signal is created, with the remaining energy, again, propagating further down the channel.

In DWDM applications, closely spaced temporal modes are used to transmit more information down a single mode fiber. In these signals, each wavelength λ contains different information. Typically, a multiple number of lasers are used wherein each laser generates a specific wavelength λ, and where their equivalent frequencies are spaced tens of gigahertz apart.

Figure 12:
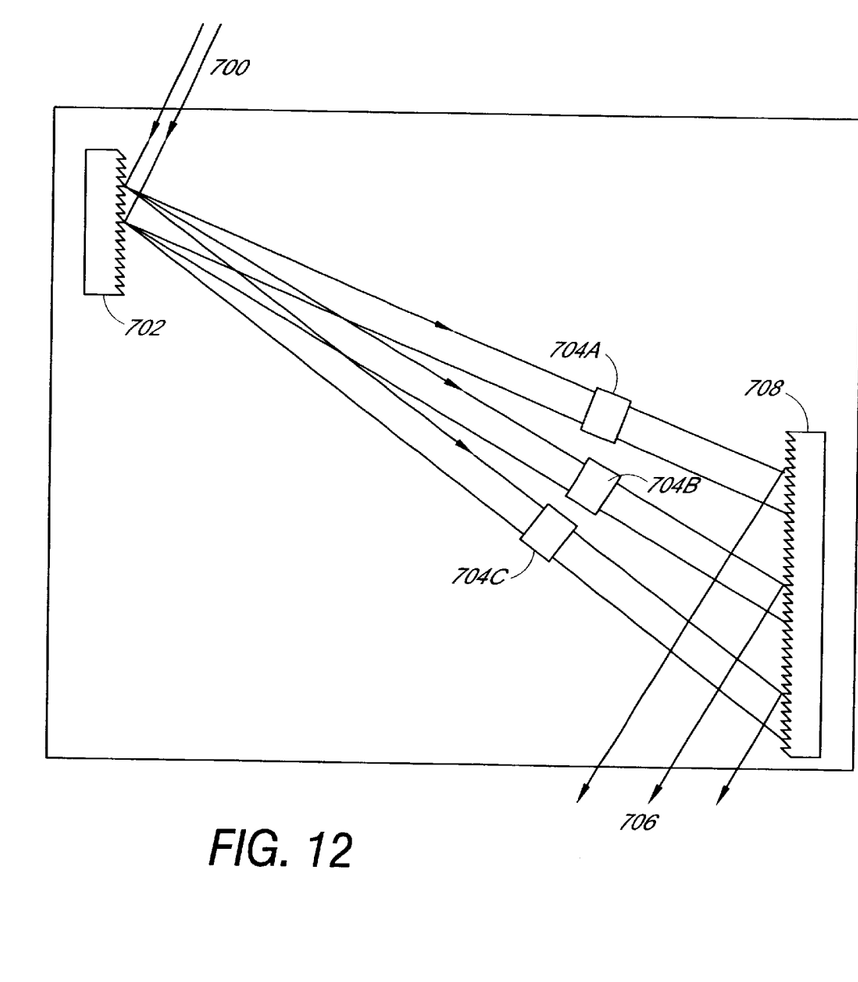
FIG. 12 is a top view of a device using two facing reflection gratings.

This invention also provides a method of controlling various closely spaced modes produced by a continuous source 700 of multiple wavelengths $\lambda_1, \ldots \lambda_n$ as shown in FIG. 12. By separating the laser modes of the input beam 700 using a grating 702 (as seen in FIG. 12), switches 704A–C can be inserted into the separated beams, thereby switching each wavelength $\lambda_n$ independently. After switching, reconstruction 706 of the input beam 700 with selected signals $\lambda_1, \ldots \lambda_m$ can be achieved using an output grating 708.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An optical device, comprising:
  a signal input port;
  a first signal output port;
  a second signal output port;
  a controllable optical beam source; and
  a material susceptible to forming a plurality of radiation induced transient color centers such that a refractive index change is induced in said material when illuminated with said controllable optical beam source so as to reflect an optical signal entering the optical device at said signal input port to said first signal output port when said controllable optical beam source is on, and so as to transmit said optical signal entering the optical device at said signal input port to said second signal output port when said controllable optical beam source is off.

2. The optical device of claim 1, further comprising an optical substrate.

3. The optical device of claim 1, further comprising a plurality of waveguides.

4. The optical device of claim 1, further comprising a plurality of optical fibers.

5. The optical device of claim 1, wherein said controllable optical beam source is a solid state laser.

6. The optical device of claim 1, wherein said controllable optical beam source is a light emitting diode.

7. The optical device of claim 1, wherein said material comprises a crystal.

8. The optical device of claim 1, wherein said material comprises a glass.

9. The optical device of claim 1, wherein said material comprises lithium fluoride.

10. The optical device of claim 1, wherein said color centers increase the absorption of the material at specific wavelengths.

11. The optical device of claim 1, wherein said color centers have short lifetimes.

12. The optical device of claim 1, further comprising an additional controllable optical beam source configured to erase said refractive index change.

13. The optical device of claim 1, wherein said controllable optical beam comprises ultraviolet light.

14. The optical device of claim 1, wherein said controllable optical beam comprises visible light.

15. An optical switch comprising a material susceptible to forming a plurality of radiation induced transient color centers, and a first controllable radiation source wherein a desired refractive index change is produced in said material when illuminated with said first controllable radiation source.

16. The optical switch of claim 15, further comprising a second controllable radiation source configured to erase said desired refractive index change.

17. An optical router, comprising:
  a plurality of signal input ports;
  a plurality of signal output ports; and
  a plurality of optical switches, said plurality of switches comprising:
    a first controllable optical beam source; and
    a material having a plurality of radiation induced transient color centers such that a reflective optical structure is formed in said material when illuminated with said first controllable optical beam source so as to reflect an optical signal entering at least one of said plurality of signal input ports to at least one of said plurality of signal output ports.

18. The optical router of claim 17, wherein said plurality of optical switches further comprise a second controllable optical beam source such that said reflective optical structure in said material is erased when illuminated with said second optical beam source.

19. A method of altering the propagation direction of an optical signal, comprising receiving said optical signal on a surface of a material susceptible to forming a plurality of radiation induced transient color centers, and inducing a refractive index change in said material by illuminating said material with a controllable radiation source.

20. The method of claim 19, wherein said material comprises lithium fluoride.

21. The method of claim 19, wherein said controllable radiation source is a light emitting diode.

22. An optical switch comprising a plurality of layers, wherein at least one layer is made of a material which is susceptible to forming radiation induced transient color centers, and a first controllable radiation source wherein a desired refractive index change is produced in said at least one layer with said first controllable radiation source.

23. The optical switch of claim 22, wherein said material comprises lithium fluoride.

24. The optical switch of claim 22, further comprising a second controllable radiation source configured to erase said desired refractive index change.

25. A method of altering the propagation direction of an optical signal comprising:

passing said optical signal through a material; and inducing transient color centers in a portion of said material to create a first portion of said material having a first index of refraction and a second portion of said material having a second index of refraction, whereby said optical signal is reflected at an interface between said first portion and said second portion.

26. The method of claim 25, wherein said material comprises lithium fluoride.

27. An optical switch comprising:

a block of material having an optical signal input port and an optical signal output port;

a light source positioned to illuminate a surface of said block of material and induce transient color centers in said block of material; and a mask covering a portion of said surface.

28. The optical switch of claim 27, wherein said material comprises lithium fluoride.

29. The optical switch of claim 27, wherein said light source is a light emitting diode.

* * * * *